Oct. 23, 1962  S. A. SCHERBATSKOY  3,060,315
PIPE-LINE EXPLORATION
Filed Jan. 17, 1955  2 Sheets-Sheet 1
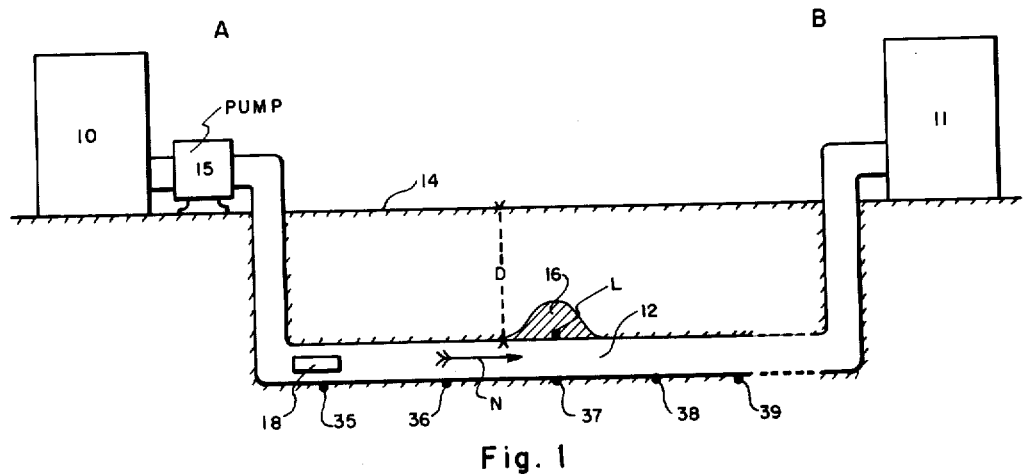
Fig. 1
Fig. 3
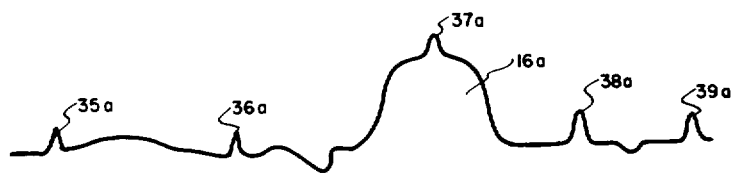
Fig. 4
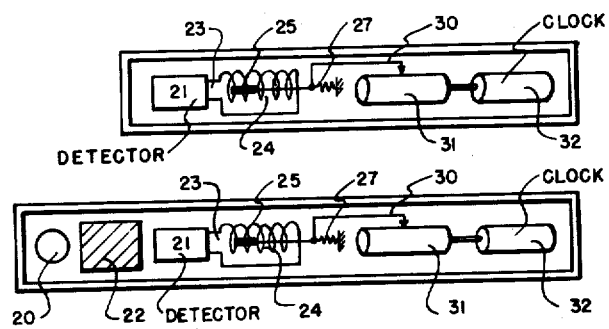
Fig. 5
Fig. 2
INVENTOR.
Serge A Scherbatskoy Oct. 23, 1962 — S. A. SCHERBATSKOY — 3,060,315
PIPE-LINE EXPLORATION
Filed Jan. 17, 1955 — 2 Sheets-Sheet 2

INVENTOR.
Serge A. Scherbatskoy

United States Patent Office 3,060,315
Patented Oct. 23, 1962

3,060,315
PIPE-LINE EXPLORATION
Serge A. Scherbatskoy, 804 Wright Bldg., Tulsa, Okla.
Filed Jan. 17, 1955, Ser. No. 482,240
9 Claims. (Cl. 250—83.3)

The present invention relates to methods of locating leaks in pipe lines and pertains more particularly to a sensitive and rapid method of finding leaks in buried pipe lines.

It is an object of this invention to simplify the process of detecting leaks in pipe lines and to provide a sensitive method of detecting leaks in pipe lines whereby small leakages can be found before growing to more serious proportions.

Other objects of my invention will be readily apparent from the following description taken in reference to the attached drawing, wherein:

FIG. 1 illustrates a pipe line buried below the earth's surface and provided with suitably spaced radioactive markers.

FIG. 2 shows an exploring element comprising a source of neutrons.

FIG. 3 represents a trace obtained under normal operating conditions.

FIG. 4 represents a trace obtained in the presence of a leak in the pipe line.

FIG. 5 shows an exploring element for detecting radioactivity in the soil surrounding the pipe line.

Figure 6:
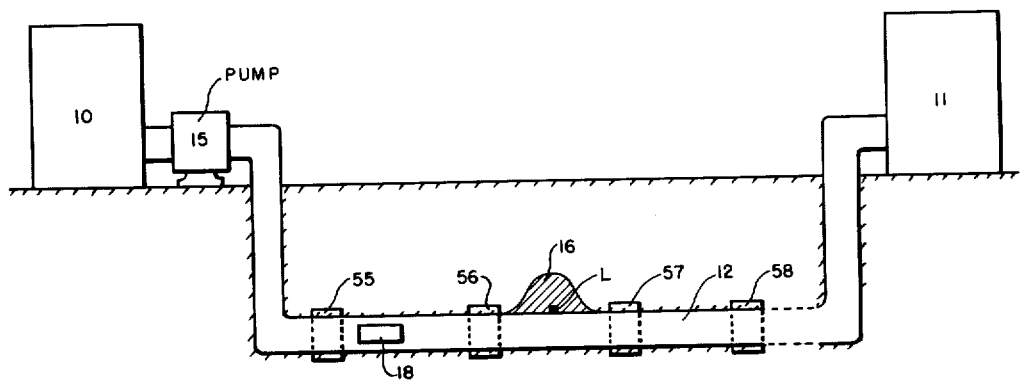
FIG. 6 illustrates a pipe line system provided with suitably spaced casing collars as markers.

FIG. 1 shows schematically an arrangement for transporting a liquid such as crude oil or gasoline from a storage tank 10 at a location A to a storage tank 11 at a location B remote from the location A. The two storage tanks are connected by means of a pipe line 12, said pipe line being buried below the earth's surface 14 at a depth D. The transmission of oil is effected by means of a pump 15 adjacent to the tank 10 which forces the oil to move in the direction of the arrow N from the tank 10 to the tank 11.

If a leak occurs in the pipe line at a location designated by L a portion of the oil or gasoline flowing in the pipe line is forced out of the pipe line through the leak and forms an accumulation of oil 16 in the portion of the soil immediately adjacent to the point L. In order to detect the leak and the occurrence of such accumulation, I utilize an exploring instrument 18 which is inserted in the pipe 12 at the outlet of the pump 15 and is adapted to move in the direction of the arrow N from the station A to the station B under the pressure of the moving oil stream.

The instrument 18 is shown more in detail in FIG. 2. It contains a source of neutrons 20 such as radium beryllium mixture and a detector 21 of gamma rays, said detector being separated from said source by a shield 22. The source 20 emits neutrons into the earth formation surrounding the pipe and these neutrons undergo numerous collisions as a result of which they are slowed down and eventually are captured by various elements in said formations. Upon capture, gamma rays are emitted which are intercepted by the detector 21 and cause said detector to produce across its output terminals 23 a D.C. voltage representing the intensity of said intercepted gamma rays. The voltage derived from the output terminals 23 is applied to a solenoid 24. The solenoid is provided with a plunger 25 which is adapted to move longitudinally along the axis of the solenoid in such a manner that the longitudinal displacements of the plunger from its initial position are proportional to the voltage across the terminals 23. The mechanism of the plunger motion is well known in the art. It is based on the suction effect exerted by the electromagnetic field of the solenoid 24 upon the plunger 25 and on the opposing restoring effect due to a spring 27.

The plunger 25 is fixedly attached to a pen 30 which is slidable longitudinally upon the surface of a rotating drum 31, said drum being driven at a constant angular velocity by means of a clock 32.

The cylinder 31 is covered with a sheet of paper upon which is impressed a trace representing the position of the pen 30 at various times corresponding to the angular displacements of the clock mechanism 32. FIGS. 3 and 4 represent two such traces obtained on the cylinder 31 which cover the travel of the exploring instrument from the location A to the location B. FIG. 3 represents normal operating conditions and FIG. 4 represents the conditions when a leak is present in the neighborhood of the point L.

It is apparent that when the exploring instrument 18 travels in the pipe line from A to B, various portions of the earth surrounding the pipe line are irradiated by the neutrons from the source 20. Some of these portions vary in their hydrogen content and therefore the effectiveness of the earth in slowing down neutrons varies at various locations along the pipe line. Thus the concentration of slow neutrons outside of the pipe varies and therefore as the exploring instrument travels in the pipe line it receives varying amounts of gamma rays of capture. These gamma rays of capture intercept the detector 21 and produce corresponding variations in the voltage across the terminals 23, said voltage variation representing the variation in hydrogen content in the soil outside of the pipe line. These variations in voltage produce corresponding motion of the pen 30 on the rotating drum 31, thus producing traces such as shown in FIG. 2 and FIG. 3.

We shall refer again to FIG. 1 and assume that the exploring instrument as shown in FIG. 2 is traveling in the pipe line 12 from the station A to the station B. The pipe line is provided on its periphery with a series of radioactive capsules containing a relatively small amount of radium and located at the points 35, 36, 37, 38, 39, said points being approximately equidistant one from the other.

As the exploring instrument 18 travels along the pipe line, the detector 21 receives gamma rays from various portions of surrounding medium that are successively encountered during its travel. When the exploring instrument passes in the immediate neighborhood of any of the reference points 35, 36, 37, 38, 39, it receives a concentrated beam of gamma rays which in turn produce a suddent voltage impulse across the terminals 23. This voltage causes a sudden displacement of the pen 30 from its original position and a subsequent return to its initial position. Referring now to FIG. 3 and FIG. 4, the time instants at which the exploring instrument passes in the immediate neighborhood of the points 35, 36, 37, 38, 39 are represented by the impulses 35a, 36a, 37a, 38a, 39a. The portions of trace between these impulses vary relatively slowly and represent the hydrogen content in the region separating the reference points corresponding to said impulses.

Consider now FIG. 3 representing the record produced by the pen 30 on the rotating drum under normal operating conditions, i.e. in the absence of any leak in the pipe line. If the exploring housing travels at uniform speed, the impulses 35a, 36a, 37a, 38a, 39a produced on the record are equidistant. The trace separating these impulses is substantially uniform since the hydrogen content in the formation surrounding the pipe line does not vary appreciably when the exploring housing travels from the location A to the location B. Consider now FIG. 4 representing the record produced by the pen 30 in the presence of a leak at the point L. Because of this leak, a substantial concentration 16 of oil is produced outside of the pipe line in the immediate neighborhood of the point L and, therefore, the neutrons emitted by the source 20 are slowed down more effectively in the region 16 than in the neighboring regions. Consequently at the region 16 we have an increase in the density of slow neutrons, and a corresponding increase of the gamma rays of capture emitted by said region. Therefore, the record produced by the pen 30 shows a considerably increased hydrogen content at the location 16. This is seen from the comparison of the traces shown in FIG. 3 and FIG. 4. These two traces are substantially similar one to another in the neighborhood of the markers 35a, 36a, 38a, 39a. However, in the neighborhood of the marker 37a the trace of FIG. 4 differs considerably from the trace of FIG. 3 due to the increase in hydrogen content at the point L, i.e. in the neighborhood of the point 37 that is caused by the oil seeping out through the leak into the surrounding formation.

It is therefore noted that the presence of the oil concentration outside of the pipe line and in the neighborhood of the leak produces an anomaly in the record of FIG. 4, said anomaly being represented by a sudden increase 16a in the intensity of the gamma rays detected by the instrument. It should also be noted that for a different spacing between the source 20 and detector 21 in FIG. 2, the anomaly may be different, i.e. the neutron concentration in the neighborhood of the leak L may be lower than normal and under these conditions we would not obtain a peak at 16a in FIG. 4, but a decrease of deflection. It should be noted therefore that the anomaly may manifest itself either as an increase in the output of the detector 21 (as shown in FIG. 4) or in other instance as a decrease in said output. The nature of the anomaly depends upon the design of the exploring instrument and among other things upon the distance from the source 20 to the detector 21 and upon the nature and shape of the intervening shield 22.

It is contemplated to make periodic inspections of pipe lines by means of the present method in order to detect small leaks before they grow to more serious proportion.

Consider now another embodiment of my invention based on the use of a radioactive tracer. This method comprises the step of introducing into a portion of the oil flowing through the pipe line a soluble radioactive substance, allowing said substance to become relatively uniformly distributed within the pipe line and to accumulate outside of the pipe line adjacent to a leak therein and measuring the intensity of radiation along the length of the pipe line. In this embodiment the increase at 16a of FIG. 4 is caused by the gamma rays from the accumulated radioactive tracer.

The radioactive material is preferably introduced into the pipe line in solution in a solvent which is mixed with the liquid flowing through the pipe line, which solvent may be a portion of the flowing liquid itself. Any suitable radioactive material may be used such as radium, uranium, thorium, as well as artificially produced radioactive elements such as cadmium, sodium, chlorine, iodine, zinc, iron, copper, cobalt, etc. in the form of hydrocarbon-soluble compounds, such as soaps, are suitable for use in hydrocarbon carrying pipe lines.

It will be apparent that it is not necessary that the slug of oil or gasoline containing the radioactive substance be moved all the way through the whole length of the pipe line before a survey for concentration in the environment is started. It is sufficient that enough oil be passed into the pipe line after the slug of activated material to insure that the radioactive substance is substantially washed out from inside the pipe line, leaving only significant deposits or concentrations of radioactive material outside the pipe line at the points of leakage.

My method comprises two measurements, i.e. measurements of radioactivity along the length of the pipe line before the insertion of the radioactive substance and after the insertion of the radioactive substance. The first measurement is represented by the trace of FIG. 3 and the second measurement by the trace of FIG. 4.

The exploring housing which is used in connection with this method is shown in FIG. 5. FIG. 5 contains certain elements that are identical to those in FIG. 2 and these elements have been designated by the same numerals in both figures. Thus FIG. 5 shows an arrangement for producing a graph representing variation in the intensity of gamma radiation intercepted by the detector 21. The voltage across the output terminal 23 of the gamma ray detector 21 controls the position of the plunger 25 within the solenoid 24. The plunger moves a pen 30 and a drum 31 that is rotated by a clock 32.

As the exploring element 18 moves in the pipe line from A to B, the pen 30 produces a trace representing the intensity of radiation intercepted by the detector 21. It is contemplated to make periodic inspection of pipe lines and thus under normal operating conditions to obtain a graph similar to the one shown in FIG. 3 in which the impulses 35a, 36a, 37a, 38a, 39a are produced when the element 18 passes in the immediate neighborhood of the marker points 35 to 39 and the portion of the trace between these impulses shows the radioactivity of the formations along the pipe line. In order to detect a possible leak in the pipe line a soluble radioactive material is introduced into the fluid, allowed to become relatively uniformly distributed within the pipe line and to accumulate outside the pipe line adjacent to the leak. If the leak occurs at the point L in the neighborhood of the marker 37, an accumulation of radioactive substance designated as 16 occurs. A subsequent inspection of the pipe line will yield a graph as shown in FIG. 4 in which the increase of radioactivity in the neighborhood of the impulse 37a is very noticeable and serves to indicate the presence of the leak.

Figure 7:
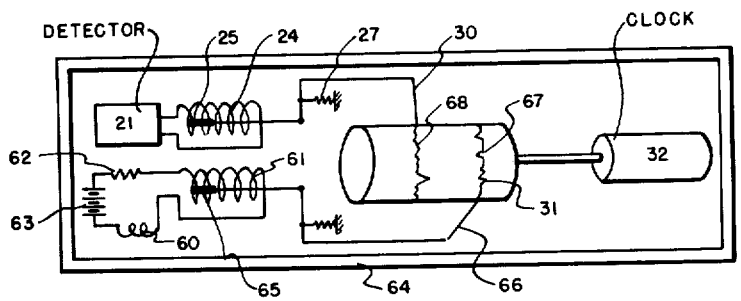
FIG. 7 shows an exploring element adapted to be used in connection with the arrangement of FIG. 6.
Figure 8:
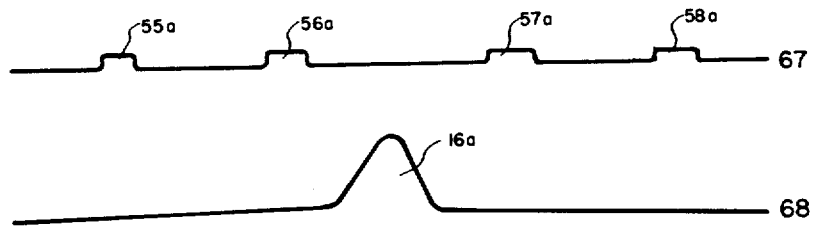
FIG. 8 shows two traces obtained by means of the exploration housing of the type shown in FIG. 7.

In the arrangements described heretofore, the position of a leak in the pipe line was determined with reference to suitable radioactive markers such as 35 to 39. FIGS. 6, 7, 8 illustrate a different method for determining the position of the leak and instead of radioactive capsules used as markers in the preceding embodiments, casing collars 55, 56, 57, and 58 are used which are arranged equidistantly along the pipe line as shown in FIG. 6. These casing collars are detected by means of a suitable casing collar detector contained within the exploring element 18 and shown in FIG. 7. This detector consists of an exploring coil 60 in series with a solenoid 61, resistor 62, and a battery 63. The exploring coil is placed adjacent to the wall 64 of the housing which is arranged to be of a non-magnetic material. The current passing through the exploring coil 60 produces a magnetic flux which passes outside of the wall 64, and is therefore influenced by the ferrous metal casing of the surrounding pipe 12. As the exploring element moves past a casing collar, the thickness of the ferromagnetic pipe changes suddenly and this introduces a transient voltage in the circuit which in turn causes a sudden change in the current passing through the solenoid 61. In response to this transient, the magnetic flux passing through the solenoid changes which in turn moves the plunger 65 and the pen 66 so as to produce a mark on the trace 67 on the surface of the drum 31 which is rotated by the clock 32.

The remaining portion of the equipment contained in the housing as shown in FIG. 7 contains the same elements that are present in the housing of FIG. 5, said elements being designated by the same numerals in both figures. Thus two traces 67 and 68 are obtained on the rotating drum, said traces being shown more in detail in FIG. 8. The trace 68 produced by the pen 30 represents the intensity of the gamma rays intercepted by the detector 21, i.e. it represents the variation in the radioactivity of the surrounding medium as the exploring element 18 travels through the pipe line and as shown in FIG. 8 the sudden increase in radioactivity designated by the hump 16a corresponds to the increase 16 in the amount of radioactive tracer which seeped out through the leak L in the arrangement of FIG. 6. The trace 67 produced by the pen 66 represents the intensity of the current passing through the solenoid 61 and the humps 55a to 58a corresponding to sudden changes in this current when the exploring coil 60 passes in the neighborhood of the casing collars 55 to 58, respectively.

It is thus apparent that the casing collars provide suitable markers for determining the position of the leak. Referring to FIG. 8 it is seen that the hump 16a on the trace 68 is located between the markers 67a and 57b. Consequently, we know that the leak occurred in the portion of the pipe line between the casing collars 56 and 57.

It should also be noted that the magnetic collar locator itself can locate leaks by the response of coil 60 of FIG. 7 to a crack or hole in the ferromagnetic pipe line, such a crack or hole constituting a magnetic anomaly. Thin corroded sections of the pipe line may also be located by the response of coil 60 since as it passes by a thinned portion it will encounter an anomaly in the ferromagnetic environment. Thus incipient leaks can be determined and their location recorded.

In case where a leak is known to exist in the pipe line, as may be indicated by pressure drops and/or downstream pump station shortages, the present method may be used in conjunction with various other methods, particularly those methods which, for example, by means of pressure measurements at the ends of the line and intermediate high points, permit narrowing the location of the leak to a short section of the line. Under such conditions, as well as in other situations, it is sometimes advisable to increase the pressure in the pipe line when the fluid is moving through the leaking section, so that there is obtained a greater concentration of fluid in the soil adjacent the leak.

It will be readily apparent that the present method of detecting leaks in pipe lines is so simple in its application that it can be easily used by the regular pipe line operators and also have a sensitivity permitting the detecion of relatively small leaks before the loss of liquid becomes excessively large.

The exploring housing shown in FIG. 7 is adapted to measure the natural radioactivity of the surrounding medium and in that way it is similar to the one shown in FIG. 5. The one difference in these instruments resides in the fact that the one shown in FIG. 5 utilizes radioactive markers and the one in FIG. 7 utilizes casing collar indicators. It is apparent that we may insert in the instrument of FIG. 7 a neutron source 20 in a manner similar to the arrangement of FIG. 2 and, such case the exploring instrument of FIG. 7 when provided with a neutron source can be used for the measurement of hydrogen content of the surrounding formation in a manner similar to the use of the instrument of FIG. 2. The only difference between the instruments of FIG. 2 and the modified instrument of FIG. 7 resides in the fact that the one shown in FIG. 2 utilizes radioactive markers and the modified instrument of FIG. 7 utilizes casing collar indicators.

I claim:

1. A method of exploring a pipe line used for transportation of liquid from point to point which comprises the steps of passing through said pipe line a free detector unit adapted to be carried through said line by said liquid, radiating from said detector unit neutrons effective to penetrate said pipe line and to bombard and interact with the earth formations adjacent said unit, detecting within said unit radiations impinging thereon from said formation and said pipe line responsively to such bombardment, recording within said unit a characteristic of such impinging radiation as a function of time, simultaneously detecting and recording within said unit as a function of time indications of spaced discontinuities in said pipe line by said unit as it travels therethrough, and producing from such recorded data a log correlating changes in such characteristic with such indications of said discontinuities.

2. In a method of exploring a pipe line used for transportation of liquid from point to point, the steps of passing through said pipe line a free exploring unit adapted to be carried through said pipe line by said liquid, generating within said unit a physical condition that extends into the space region externally adjacent said unit, detecting and recording within said unit changes in such condition produced by the varying character of said space region as said unit travels through said pipe line, simultaneously detecting and recording within said unit indications of spaced discontinuities in said pipe line, and producing from such recorded data a log correlating said indications of changes in said physical condition and said indications of spaced discontinuities.

3. A method of exploring a pipe line used for transportation of liquid from point to point which comprises the steps of inserting into said pipe line a free exploring unit adapted to be carried through said pipe line by said liquid, producing within said unit a physical condition extending into the region externally adjacent said unit, and measuring within said unit the variations in said physical condition caused by the varying character of said externally adjacent region encountered by said unit as it moves through said pipe line.

4. In a method of exploring a pipe line used for transportation of liquid from point to point, the steps of introducing into such liquid an exploring unit adapted to be driven through said pipe line by the force of such liquid and hence to travel freely therethrough, producing within said element a physical condition extending into the space region externally adjacent said element, measuring and recording within said unit variations in said physical condition caused by changes in the character of said region as said element travels through said pipe line, producing and recording within said element indications indicative of spaced discontinuities in said pipe line encountered by said element during its travel, and producing a log correlating said condition changes and said indications of spaced discontinuities.

5. In a method of exploring a pipe line used for transportation of liquid from point to point, the steps of introducing into said line a free exploring unit adapted to be carried through said line by said liquid, transmitting penetrating radiations from said unit into the space region externally adjacent thereto, detecting and recording within said unit the effects of interaction of said radiations with the matter in said space region progressively encountered by said unit as it travels through said pipe line, and producing a log recording such interaction effects as a function of time.

6. In a method of exploring a pipe line used for transportation of liquid from point to point, the steps of introducing into said line a free exploring unit adapted to be carried through said line by said liquid, transmitting penetrating radiations from said unit into the space region externally adjacent thereto, detecting and recording within said unit as a function of time the effects of interaction of said radiations with the matter in said space region successively encountered by said unit as it travels through said line, detecting and recording within said unit as a function of time indications of spaced discontinuities in said line encountered by said unit during its travel, and producing a log correlating said interaction effects and said indications of spaced discontinuities.

7. A method of exploring a pipe line used for moving liquid from point to point, said pipe line having spaced discontinuities the location of which is known, comprising the steps of introducing into said liquid an exploring unit adapted to be carried by the force of said liquid in motion and thus to travel freely through said pipe line, producing within said unit a physical condition extending into the space region externally adjacent thereto, sensing and recording in said unit variations in said condition encountered during the travel of said unit through said pipe line, detecting and recording within said unit successive signals indicative of the spatial position of said unit within said line during its said travel therethrough, and producing a log from such data correlating such condition changes with the spatial position in said line whereat such changes were detected.

8. A method of exploring a pipe line used for moving liquid from point to point, said pipe line having spaced pipe junctions, comprising the steps of introducing into said liquid a free exploring unit adapted to be carried through said line by the force of said moving liquid, producing within said unit a physical condition extending into the space region externally adjacent said unit, producing also within said unit a magnetic field extending outside said unit and into the walls of said pipe line, detecting and recording within said unit changes in said physical condition caused by variations in the character of said space region surrounding said unit as it travels through said line, detecting and recording within said unit variations in said magnetic field caused by passage of said unit through pipe junctions, and producing from said data a log correlating the position within said pipe line of changes in the character of said space region and the location of said pipe junctions.

9. A method of detecting leaks in pipe lines carrying fluid comprising the steps of injecting a radioactive solution into a fluid flowing in the line; flushing the line clear of the radioactive solution; introducing a detector-recorder unit, comprising a radioactivity radiation detector and a recorder which records the detector signal over a time period at a substantially constant speed, into the line in association with a go-devil capable of propelling the detector-recorder unit through the line in the direction of the fluid flow at a substantially constant velocity; placing a series of sources of radioactivity at predetermined distances along the downstream part of the line to make a characteristic signal on the recorder record at intervals corresponding to the location of said sources; recovering the detector-recorder unit at a downstream point along the line.

References Cited in the file of this patent

UNITED STATES PATENTS

| | | |
|---|---|---|
| 1,662,429 | Lowy | Mar. 13, 1928 |
| 2,309,835 | Fearon | Feb. 2, 1943 |
| 2,371,628 | Krasnow | Mar. 20, 1945 |
| 2,507,351 | Scherbatskoy | May 9, 1950 |
| 2,588,210 | Chrisman | Mar. 4, 1952 |
| 2,601,248 | Brenholdt | June 24, 1952 |
| 2,706,254 | Mithoff | Apr. 12, 1955 |
| 2,737,595 | Scherbatskoy | Mar. 6, 1956 |

OTHER REFERENCES

"Radioactive Isotopes as Tracers," by A. W. Kramer, from Power Plant Engineering, November 1947, pages 105 to 109.